(12) United States Patent
Park

(10) Patent No.: US 8,390,996 B2
(45) Date of Patent: Mar. 5, 2013

(54) DISPLAY DEVICE

(75) Inventor: Jong Min Park, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 208 days.

(21) Appl. No.: 12/811,578

(22) PCT Filed: Jan. 28, 2009

(86) PCT No.: PCT/KR2009/000411
§ 371 (c)(1),
(2), (4) Date: Jul. 2, 2010

(87) PCT Pub. No.: WO2009/096704
PCT Pub. Date: Aug. 6, 2009

(65) Prior Publication Data
US 2010/0309618 A1 Dec. 9, 2010

(30) Foreign Application Priority Data
Jan. 29, 2008 (KR) .................. 10-2008-0008910

(51) Int. Cl.
*H05K 7/14* (2006.01)
(52) U.S. Cl. ............... 361/679.22; 361/679.27; 248/917

(58) Field of Classification Search ............. 361/679.01, 361/679.02, 679.22, 679.27, 683, 682; 248/917–924; 312/223.1–223.2
See application file for complete search history.

(56) References Cited

U.S. PATENT DOCUMENTS

| 7,389,963 | B2 * | 6/2008 | Cho et al. ................ 248/159 |
| 7,703,736 | B2 * | 4/2010 | Oh ............................ 248/371 |
| 2006/0279189 | A1 | 12/2006 | Jeong | |
| 2007/0047188 | A1 * | 3/2007 | Kim ............................ 361/681 |

FOREIGN PATENT DOCUMENTS

| CN | 1873835 A | 12/2006 |
| DE | 10-2005-025866 A1 | 12/2006 |
| JP | 11-331735 A | 11/1999 |
| JP | 2002-044568 A | 2/2002 |
| JP | 2005-136651 A | 5/2005 |

* cited by examiner

*Primary Examiner* — Jinhee Lee
*Assistant Examiner* — Ingrid Wright
(74) *Attorney, Agent, or Firm* — Birch, Stewart, Kolasch & Birch, LLP

(57) ABSTRACT

A display device is disclosed. A display device includes a body displaying an image, and a pair of supporting shafts rotatably secured to the body, being tilted to a predetermined angle and a base member supporting the supporting shaft. The present invention relates to a display device having a tilting or height adjustment function of adjusting a viewing angle, with a simple structure and an economized production cost thereof.

14 Claims, 13 Drawing Sheets

(a)

(b)

(a)    (b)

(a)

(b)

(a)

(b)

(a)

(b)

(a)

(b)

DISPLAY DEVICE

TECHNICAL FIELD

The present invention relates to a display device. More specifically, the present invention relates to a display device having a tilting or height adjustment function of adjusting a viewing angle, with a simple structure and an economized production cost thereof.

BACKGROUND ART

Display devices typically display input video signals. Specifically, the display devices may include monitors capable of displaying images received from computers and televisions capable of displaying images and sound transmitted from broadcasting stations, by extension, all types of devices capable of displaying external input signals. Such the display device is connected with a cable broadcasting, VHS, DVD or AUDIO system to receive a video or audio signal and thus to provide images and sounds with a user.

Conventional display devices mainly adapt Braun tube types which is a CRT type. Typically, a CRT type display device is configured of a box type having a substantially large volume. If trying to install the CRT type display device in a house or office, an auxiliary stand should be further provided and the CRT type display device should be installed on a floor, using the stand.

DISCLOSURE

Technical Problem

However, with development of relating technology, the conventional CRT type display devices has been changed into flat panel display devices, for example, LCD or PDP. Because of that, the thickness of the display device can be reduced remarkably.

Such the flat panel display device may be installable in a wall-mounted or stand type. If the flat panel display device is wall-mounted, a wall-mounted device is secured to the wall and the flat panel display device is mounted on the wall-mounted device.

If the flat panel display device is stand-type, the flat panel display device is mounted on a stand.

The stand used for the stand type flat panel display device includes a neck coupled to a lower surface or rear surface of a body displaying images and a base coupled to the neck. Even being substantially thin, the flat panel display device can stand upright.

The stand is mainly functioned to stand the stand type flat panel display device and in addition, it may be functioned to rotate the stand type flat panel display device to a predetermined angle and to tilt the body capable of displaying images, which is referenced to as a tilting function.

Especially, if the display device is used as a monitor of a computer, a flat panel LCD has a relatively narrow viewing angle, compared with the conventional CRT type monitor. As a result, it is substantially important to provide the user with the tilting function such that the user may adjust a viewing angle of images displayed on the display device smoothly.

However, to provide the user with the tilting function, many parts including rotation hinges and the like are required and a disadvantage of a complex assembly process could be generated.

In addition, the many kinds of the parts such as hinges and the like might cause often failures of the display device and thus reliability of durability might deteriorate.

It is convenient for the display device having a height-adjustment function capable of adjusting the height of a body to be used as a monitor of a computer. However, at this time, if the structure of the height adjustment function is complex, the manufacturing cost should be increased.

Technical Solution

To solve the problems, an object of the present invention is to provide a display device capable of tilting a body displaying an image or adjusting the height of the body, with a reduced number of required parts and reduced production cost.

To achieve these objects and other advantages and in accordance with the purpose of the invention, as embodied and broadly described herein, a display device includes a body displaying an image; a pair of supporting shafts rotatably secured to the body, being tilted to a predetermined angle; and a base member supporting the supporting shaft.

The supporting shafts may be secured to the body in a state of being symmetrically tilted to a substantially identical angle, respectively.

The base member may be rotated in contact with an installation surface, corresponding to the rotation of the supporting shaft, and the base member may include a pair of horizontal shafts coupled to the supporting shafts, substantially perpendicular to the supporting shafts.

The supporting shaft and the horizontal shaft may be formed integrally.

The supporting shaft and the horizontal shaft may have a 'L' shape or may be coupled to each other to have a 'L' shape.

The supporting shaft and the horizontal shaft may have a '⊥' shape or may be coupled to each other to have a '⊥' shape.

The display device may further include rotation angle limiting means limiting a rotation range of the supporting shaft.

The base member may further include a base housing accommodating the horizontal shaft and a horizontal shaft motion space guiding the rotation of the horizontal shaft may be formed in the base housing, and the rotation angle limiting means may be a limiting prominence provided at a border of the horizontal shaft motion space.

The rotation angle limiting means may be a guide projection formed either of the supporting shaft and the body and a guide groove formed at the other.

The guide groove may be formed in a predetermined area of a surface of the supporting shaft along a circumferential direction.

A height adjustment groove may be formed at the surface of the supporting shaft along a longitudinal direction, the height adjustment groove in communication with the guide groove, and a plurality of guide grooves may be formed at predetermined positions different from a position of the height adjustment groove.

A curvature part, curved in an upward direction of the guide groove, may be provided near a border between the height adjustment groove and the guide groove to prevent the guide projection from coming into the height adjustment groove, if tilting the body.

A body securing part to which the supporting shaft is secured may be provided at a rear of the body and the supporting shaft may be rotatably inserted in the body securing part. In another aspect, a display device includes a body displaying an image; and a pair of stands secured to the body, having a '⊥' shape. If the body is tilted, a '-' portion of the stand may be rotated corresponding to rotation of a 'l' portion of the stand rotatably secured to the body in a state of being tilted or the 'l' portion of the stand may be rotated corresponding to the rotation of the '-' portion of the stand.

The 'l' portions of the pair of the '⊥'-shaped stands may be symmetrically secured to the body in a state of being tilted to a substantially identical angle, respectively.

The '-' portion formed integrally with the 'l' portion of the stand rotatably secured to the body may be rotated in contact with an installation surface.

The '-' portion of the stand may be secured to a base housing and the '-' portion of the stand may be rotated in contact with a lower surface of the base housing.

A body securing part to which the 'l' portion of the stand is secured may be provided at a rear of the body and the supporting shaft may be rotatably inserted in the body securing part.

Advantageous Effects

The present invention has following advantageous effects.

According to the display device of the present invention, the tilting angle of the display device or the height of the body may be adjusted simply and conveniently.

Furthermore, the number of parts composing the stand which performs the tilting and/or height adjustment function may be reduced remarkably.

A still further, the display device according to the present invention may provide the tilting or height adjustment function with reduced production cost.

Lastly, the configuration of the stand may be simplified and various designs may be applicable to the display device according to the present invention accordingly.

DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE

Reference will now be made in detail to the specific embodiments of the present invention, examples of which are illustrated in the accompanying drawings. Wherever possible, the same reference numbers will be used throughout the drawings to refer to the same or like parts.

A display device according to an exemplary embodiment includes a body displaying images, a pair of supporting shafts rotatably coupled to the body, being symmetrically tilted to an identical angle, and a base member supporting the supporting shafts.

Figure 1:
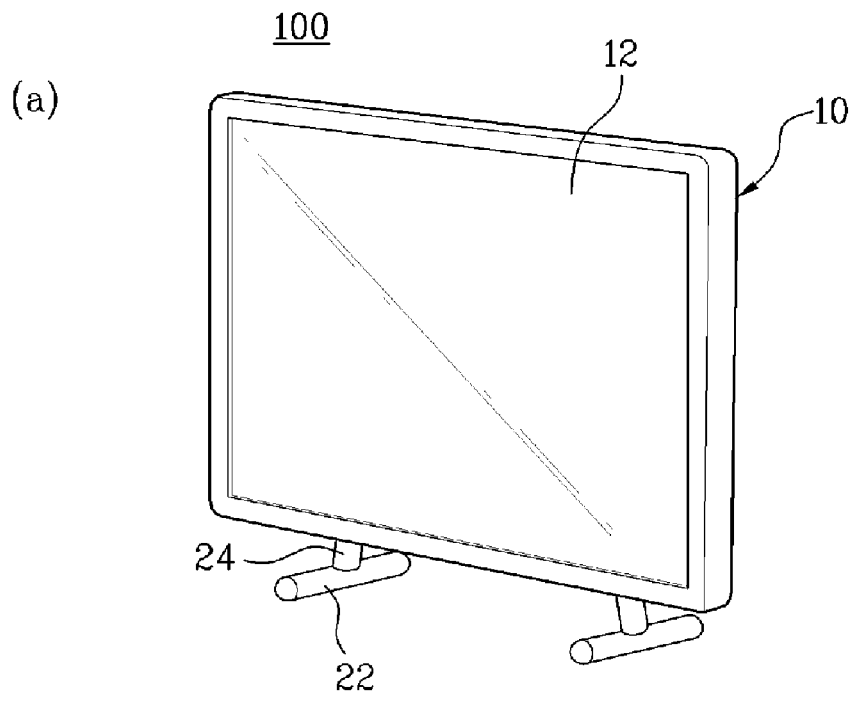
FIG. 1 schematically illustrates a display device according to an exemplary embodiment.
Figure 1:
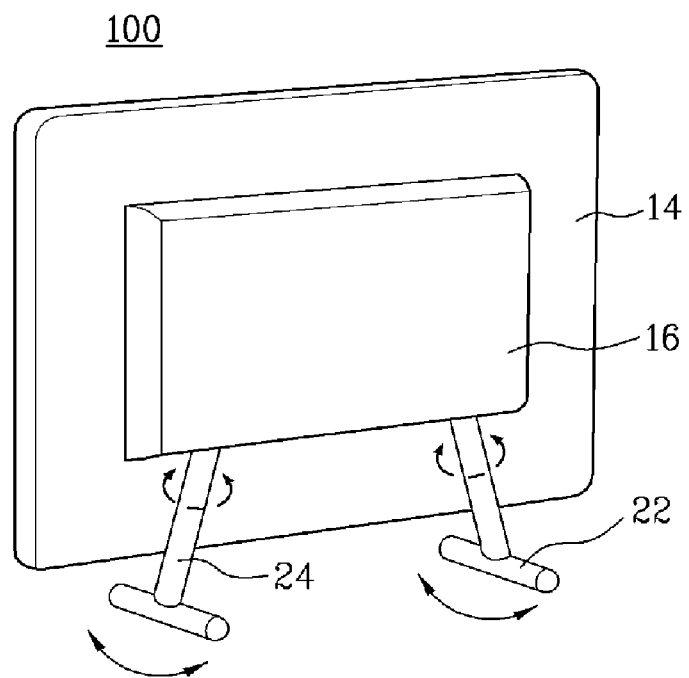

FIG. 1 illustrates the display device 100 according to the exemplary embodiment. Specifically, FIG. 1(a) is a front perspective view of the display device and FIG. 2(b) is a rear perspective view of the display device.

The display device 100 includes a body 10, a supporting shaft 24 and a base member. The body 10 includes a panel 12 displaying images and a body housing 14 covering the panel. The body housing 14 defines an exterior appearance of the body 10. The supporting shaft 24 supports a load of the body. The base member disperses the load of the body 10 supported by the supporting shaft 24.

According to an embodiment of FIG. 1, the base member is coupled to the supporting shaft perpendicularly and it includes a pair of horizontal shafts 22 which rotates in parallel to the floor, corresponding to the rotation of the supporting shaft. Also, the base member may further include a housing covering the horizontal shaft, which will be described later.

The horizontal shaft and the supporting shaft have a structure in that either of the two rotates and the other rotates together. The horizontal shaft is contact-rotated on an installation surface of the display device and the supporting shaft is inserted in the body to rotate on its own axis.

A body coupling part 16 may be provided on a rear surface of the body 10. The body coupling part 16 may be any types enabling the supporting shaft 24 to be coupled to the body coupling part 16 in a state of being rotatably tilted to a predetermined angle.

Here, the supporting shaft 24 supporting the body 10 of the display device 100 according to the present invention may be coupled to or formed integrally with the horizontal shaft 22 to be perpendicular to the horizontal shaft 22. According to the embodiment shown in FIG. 1, the horizontal shaft 22 may be a pipe type having a circular section like the supporting shaft 24.

Alternatively, the supporting shaft 24 and the horizontal shaft 22 provided separate may be coupled to each other or may be formed integrally. From now on, the term that the supporting shaft 24 is coupled to the horizontal shaft 22 may include that separate shafts is coupled to each other or that the shafts are formed integrally.

In the embodiment of FIG. 1, the supporting shaft 24 and the horizontal shaft 22 are configured of pipes formed integral with a '⊥' shape. However, if the supporting shaft 24 is perpendicular to the horizontal shaft, the supporting shaft 24 and the horizontal shaft 22 may be coupled in a 'L' shape.

At this time, in case that the supporting shaft 24 and the horizontal shaft 22 are coupled or formed in the 'L' shape, the base member including the horizontal shaft 24 may have an auxiliary housing and the horizontal shaft 24 may be inserted in the auxiliary housing. This is preferable for a safe tilting of the body. the embodiment in that the supporting shaft 24 and the horizontal shaft 22 are coupled or formed in the 'L' shape will be described later in reference to a corresponding drawing.

The supporting shafts 24 may be secured to the body 10 and they are rotatably secured to the body, with being tilted to a substantially identical angle, respectively.

That is, the supporting shafts 24 are secured to the rear surface of the body 10 approximately in parallel to the panel 12 of the body, being tilted to the same angle, respectively and symmetrically.

Here, the term of being tilted to the substantially identical angle may mean that the supporting shafts 24 seem to be inclined to almost the same angle, not means that the inclined angles of the supporting shafts are completely identical.

In addition, 'being tilted' means that the supporting shafts 24 are secured to the rear surface of the body approximately in parallel to the panel 12 of the body, with the both supporting shafts not being parallel to each other.

Again, the meaning of securing the supporting shafts 24 to the body is that each of the supporting shafts 24 is able to rotate on its own axis, which is a virtual center axis, with being secured to the body.

For that, a body securing part 16 is provided on the rear surface of the body 10 and the supporting shafts are secured to the body securing part 16, specifically, rotatably inserted in the body securing part 16.

Figure 2:
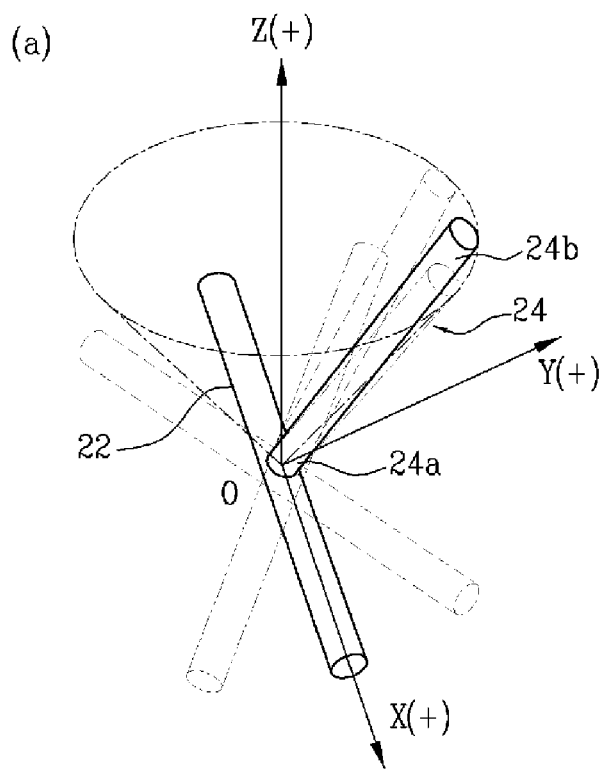
FIG. 2 is a conceptual view illustrating an operational state of a stand installed to the display, the stand including a supporting shaft and a horizontal shaft.
Figure 2:
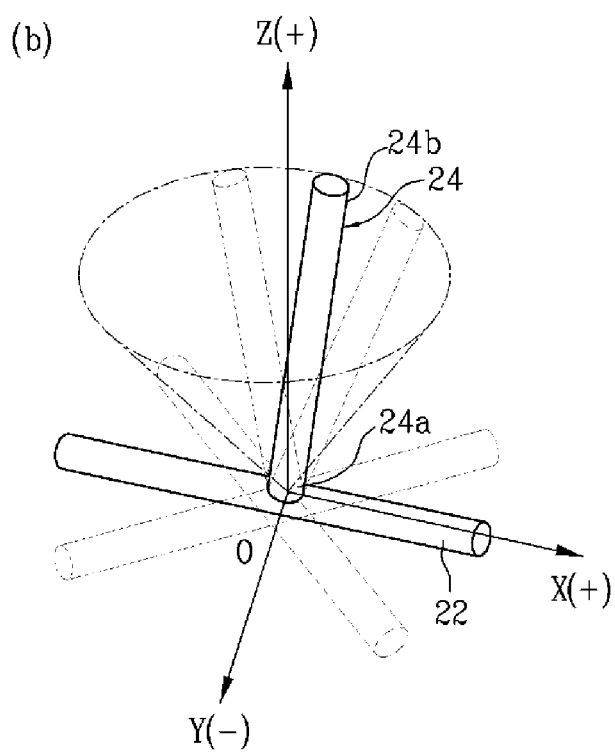

FIG. 2 is a conceptual view illustrating an operational state of a stand 27 including the supporting shafts and the horizontal shaft 22. Specifically, FIGS. 2(a) and 2(b) are perspective views illustrating rotational sates of the stand 27 observed at different angles, respectively.

As shown in FIG. 2, the supporting shafts 24 may be formed integrally or connected with the horizontal shaft 22. The supporting shafts 24 may be rotatably secured to the body 10, with being tilted to the identical angles symmetrically from the body as mentioned above.

As shown in FIG. 2, the supporting shafts 24 may be connected with the horizontal shaft 22 substantially in parallel to the horizontal shaft 22.

The meaning of 'substantially parallel' should include a broad concept that the supporting shaft 24 and the horizontal shaft 22 look approximately to 90 degrees, not just meaning the right angles, which is 90 degrees numerically, to each other.

FIG. 2 shows an operational sate of the supporting shafts 24 and the horizontal shaft 22 both composing the stand 27, specifically, states in which the body is not inclined and that the body is inclined, respectively.

FIG. 2 shows virtual axes of X, Y and Z which meet at right angle each other in a three-dimensional space where the stand 27 is installed. A floor in contact with the horizontal shaft, where the display device is installed, is corresponding to X-Y plane and Z axis is a vertical axis perpendicular to the X-Y plane. For explanation convenience's sake, the body of the display device is not shown and one of the pair of the stands is shown to explain a displacement state of the horizontal shaft and the supporting shaft.

It is premised that the horizontal shaft 22 rotates in contact with the virtual X-Y place. The horizontal shaft 22 rotates on the virtual X-Y plane in contact, corresponding to the tilted angle of the body. As a result, the supporting shaft 24 connected with the horizontal shaft 22 perpendicularly, not in parallel to Z axis, is displaced and forms a predetermined circle, corresponding to the rotation angle of the horizontal shaft 22.

More specifically, if a connection position (O) between the supporting shaft 24 and the horizontal shaft 22 is supposed as a center of a three-dimensional space defined by X, Y and Z axes, the horizontal shaft 22 rotates about the connection position (O) on the X-Y plane and the supporting shaft 24 is displaced and forms a curvature part, for example, an outer circumferential surface of a reverse corn having the connection position (O) as a summit.

That is, either of both opposite ends of the supporting shaft 24 will be referenced to as an end 24a, the other end of the supporting shaft 24 as the other end 24b. when the horizontal shaft 22 rotates, the end 24a of the supporting shaft 24 forms the summit of the reverse corn and the other end 24b of the supporting shaft 24 forms a circumference of a bottom surface, that is, an upper surface of the reverse corn.

As a result, the other end 24b of the supporting shaft 24 is displaced to form an arc of a circle having a predetermined semi-diameter with a predetermined height in a direction of Z axis.

The horizontal shaft 22 rotates for the tilting of the body and thus it rotates in a predetermined range of the angle. The rotation of the supporting shaft 24 forms a partial circumferential surface of the reverse corn.

The supporting shaft 24 is secured to the rear surface of the body 10 of the display device. As shown in FIG. 1, the body 10 having the supporting shaft 24 secured thereto is secured to the panel 12 in parallel. The tilting of the supporting shaft 24 with respect to Z axis perpendicular to the X-Y plane may cause the tilting of the body 10 in a forward and backward direction, which is secured to the supporting shaft 22 coupled to the horizontal shaft when the horizontal shaft rotates.

As shown in FIG. 2, a state in that the supporting shaft 24 is positioned in Y-Z plane and that the horizontal shaft 22 is in X axis may be a state in that the body 10 stands upright. At this time, if the supporting shaft 24 coupled to the horizontal shaft 22 is out of Y-Z place, the body 10 secured to the supporting shaft 24 approximately in parallel may be tilted in a forward and backward direction.

The stand 17 shown in FIG. 2 is described in case that the supporting shaft 24 is coupled to the horizontal shaft 22 perpendicularly and it is not limited to this case. Even in case that the supporting shaft 24 is coupled to the horizontal shaft 22 not perpendicularly, the same effect could be achieved. However, the horizontal shaft should be approximately perpendicular to the supporting shaft 24 in order that the body 10 may stand upright in a state of the pair of the supporting shafts 24 being in parallel each other.

Figure 3:
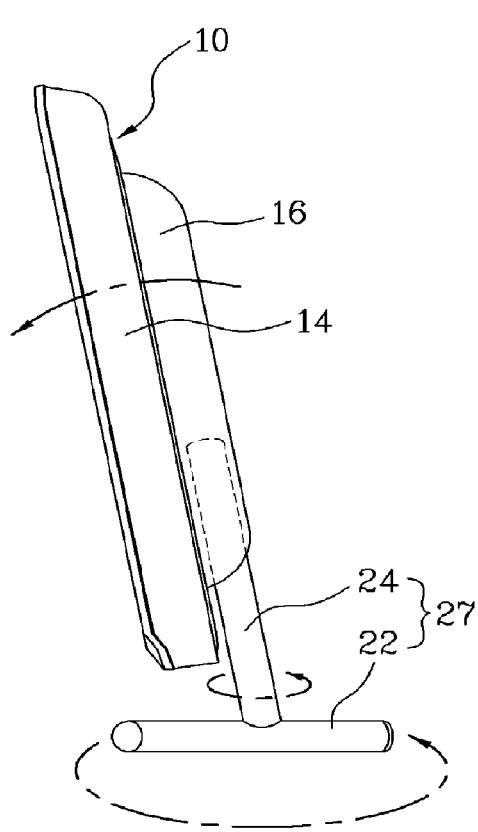
FIG. 3 is a side sectional view illustrating the display device according to the embodiment of the present invention, when being tilted.
Figure 3:
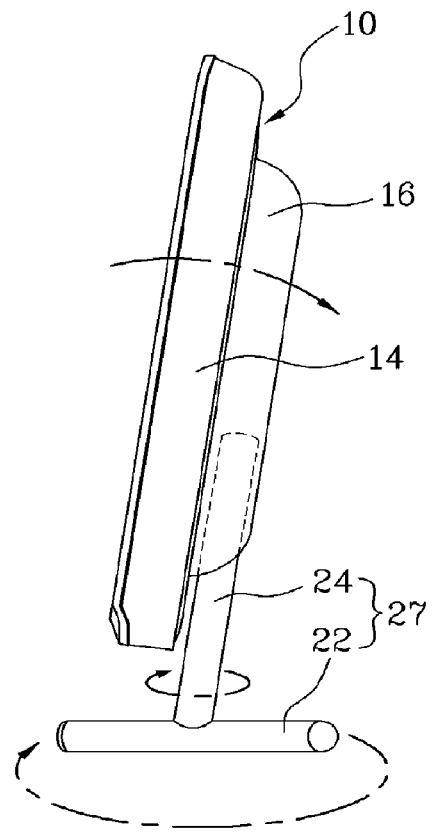

The tilting angle of the body approximately in parallel to the supporting shafts 24, corresponding to the displacement of the tilted supporting shafts 24 may be adjustable. FIG. 3 illustrates a side sectional view of the display device 100 when being tilted. Specifically, FIG. 3(a) illustrates a side sectional view of the body 10 tilted frontward and FIG. 3(b) illustrates the body 10 tilted backward.

As shown in FIG. 3, the body 10 may be tilted according to the rotation of the tilted supporting shaft. The supporting shaft 24 is rotatable within the body securing part 16 in the predetermined range of the angle and thus the range in which the body 10 can be tilted may be limited.

In addition, the coupling structure between the supporting shaft 24 and the horizontal shaft 22 may be a single stand 27. if then, the body 10 may be supported and tilted by a pair of stands having a tilted '⊥' shape.

A 'l' portion of the '⊥'-shaped stand, which is secured to the body 10, is rotatably secured in the body securing part 16.

A '-' portion of the stand 27 is coupled to the 'l' portion of the stand 27 and it is rotatable in contact with an installation surface of a place, for example, a table, corresponding to the rotation of the 'l' portion.

Here, the 'l' portion of the stand 27 may be formed integrally with the '-' portion or provided separately to be coupled to the '-' portion.

Accordingly, the stand 27 may be formed in the '⊥' shape or coupled to be '⊥'-shaped.

The stand 27 may be secured in an auxiliary housing. The 'l' portion of the '⊥'-shaped stand 27 may be corresponding to the supporting shaft 24 secured to the rear surface of the body, with being rotatably tilted, and the '-' portion of the '⊥'-shaped stand 27 may be corresponding to the horizontal shaft 22 coupled to or formed integrally with the supporting shaft 24.

If the 'l' portion of the '⊥'-shaped stand 27 rotates on its own axis, in a state of being tilted, the other '-' portion coupled to the 'l' portion perpendicularly will tilt the 'l' portion of the stand 27 secured to the body 10 forward and backward to maintain its both ends to contact with the installation surface. As a result, the body 10 secured to the 'l' portion of the '⊥'-shaped stand 27 may be tilted.

At this time, this tilting is generated by the securing of the supporting shaft 24 to the body 10, in a state of the supporting shaft being tilted. Neither of the supporting shaft and the horizontal shaft is rotated prior to the other. It can be said that the rotation of either the supporting shaft or the horizontal shaft causes the rotation of the other.

Also, it is definitely obvious that the supporting shaft is not rotated corresponding to the horizontal shaft.

Observed in a side of the 'l' portion of the '⊥'-shaped stand 27, the 'l' portion coupled to the '-' portion, being tilted to the predetermined angle, is moved corresponding to the rotation of the '-' portion in contact with the installation surface and the body secured to the '-' portion is tilted together corresponding to the forward and backward tilting of the 'l' portion.

Figure 4:
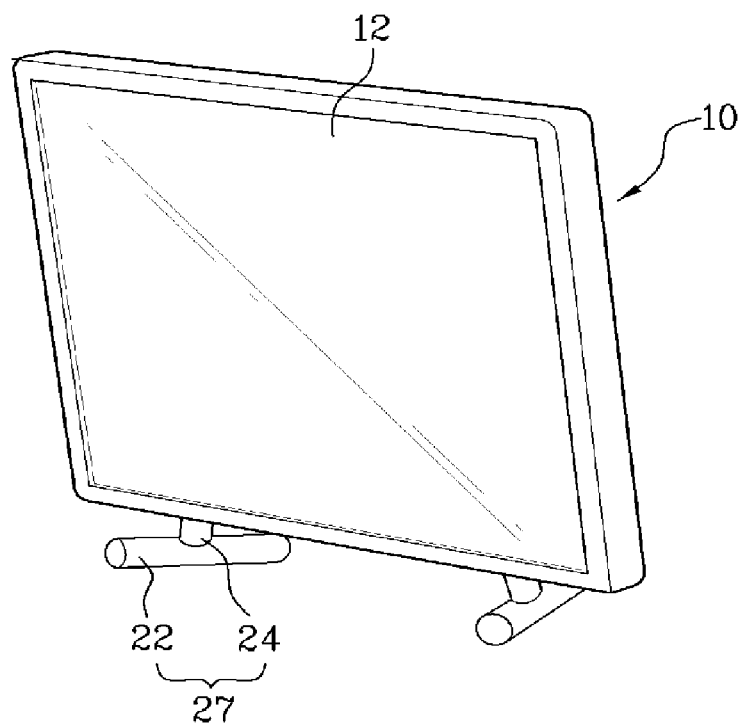
FIG. 4 is a perspective view illustrating the tilted display device shown in FIG. 3, observed in front.
Figure 4:
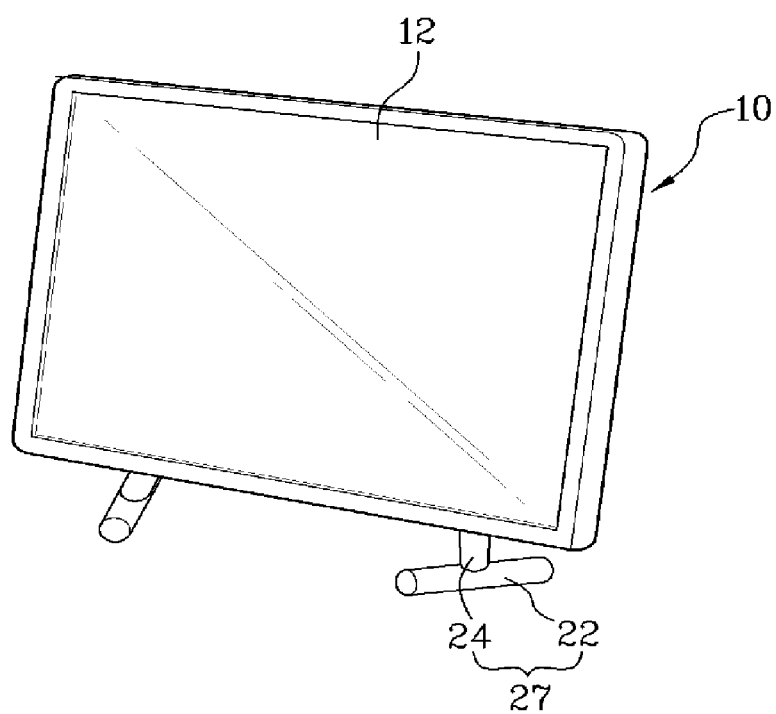

FIG. 4 is a perspective of the tilted body 10 in a front direction. as mentioned above, the supporting shaft 24 is rotated in a state of being secured to the body 10, corresponding to the tilting of the body 10, and the horizontal shaft 22 perpendicularly coupled to the supporting shaft 24 is rotated about the supporting shaft 24 on the installation surface of the display device.

In case that the body is tilted forward with respect to a front of the body, the horizontal shafts 22 are rotated, looking a front of the horizontal shafts open. In case that the body is tilted backward, the horizontal shafts 22 are rotated, looking a rear thereof open.

At this time, a rubber packing (not shown) may be attached to the horizontal shaft 22 such that the horizontal shaft 22 may be rotated smoothly and slidingly. However, the friction, if increased too much, would require much effort of the user when adjusting a viewing angle of the body 10. Because of that, it is preferable that a member supplying a friction enabling the user to rotate the horizontal shafts 22 smoothly may be provided. Rather than the friction member attached to the installation surface and the horizontal shaft, the above friction members (not shown) may be provided at an inside of the body securing part 16 and a contact surface of the supporting shafts 24 where the supporting shafts 24 are secured to the body securing part 16, respectively, to maintain the adjusted tilting angle of the body 10. In this case, it is also preferable that the friction is provided enough for the user to tilt the body smoothly and for the body 10 to maintain its tilted angle.

As shown in FIGS. 3 and 4, if the body 10 displaying images is tilted, the force tending to tilt the body farther in the tilted direction because of the weight of the body. At this time, the friction members provided at the horizontal shafts 22 or the supporting shafts 24 may be employed to maintain the tilted angle. However, if the body is tilted to angles over a predetermined value, the body fails to support its weight and happens to fall down. Thus, means capable of limiting the tilting angle of the body may be required. The tilting angle of the body is corresponding to the rotation angle of the supporting shafts 24 secured to the body 10. Next, rotation angle limiting means of the supporting shafts 24 will be described.

The rotation angle limiting means may be a guide projection formed at either of the supporting shaft and the body and a guide groove formed at the other.

If the guide groove is formed at the supporting shaft, the guide projection may be formed at the body and vice versa. For explanation convenience's sake, the latter is adapted and it will be described.

A height adjusting groove, which will be described later, is in communication with the guide groove and thus the guide groove is formed at the supporting shaft. However, it is definitely possible that the height adjusting groove is formed at the body if the guide groove is formed at the body.

Figure 5:
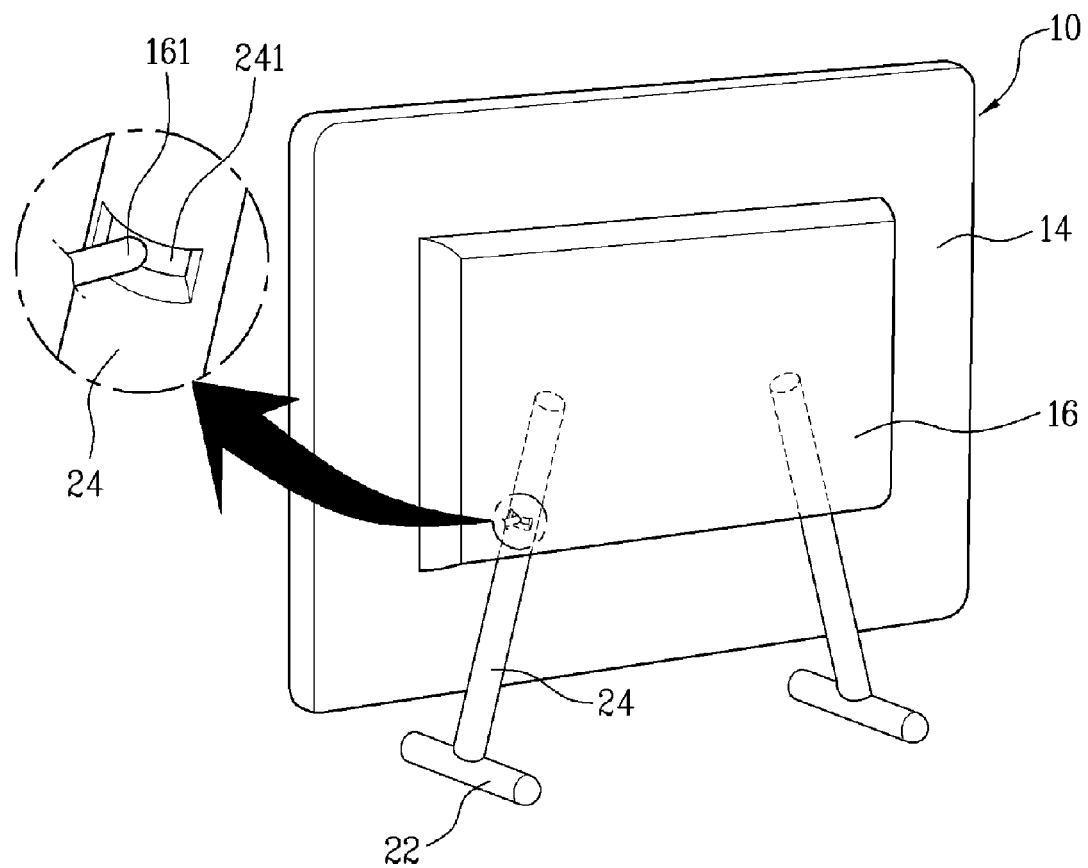
FIG. 5 is a diagram illustrating the display device including rotation angle limiting means.

FIG. 5 illustrates an embodiment of a display device including that the rotation angle limiting means. According to this embodiment, the rotation angle limiting means may be a guide groove 241 formed at a predetermined portion of a circumference of the supporting shaft 24 and a guide projection 161 inserted in the guide groove 241 to limit the rotation angle of the supporting shaft 24.

The guide projection 161 formed at the inside of the body securing part 16 cannot move and the guide groove 241, if being formed at a predetermined portion of the circumference of the supporting shaft 24, may limit the rotation angle of the supporting shaft 24.

This embodiment presents the guide groove 241 formed at the supporting shaft 24 and the guide projection 161 formed at the body securing part 16 and however the rotation angle of the supporting shaft 24 may be limited even if their positions may be exchanged with each other. That is, the guide projection may be formed at the supporting shaft 24 and the guide groove may be formed at the body securing part 16. The guide projection and the guide groove may be employed as means capable of rotatably securing the body 10 to the supporting shaft 24 without being separated.

Figure 6:
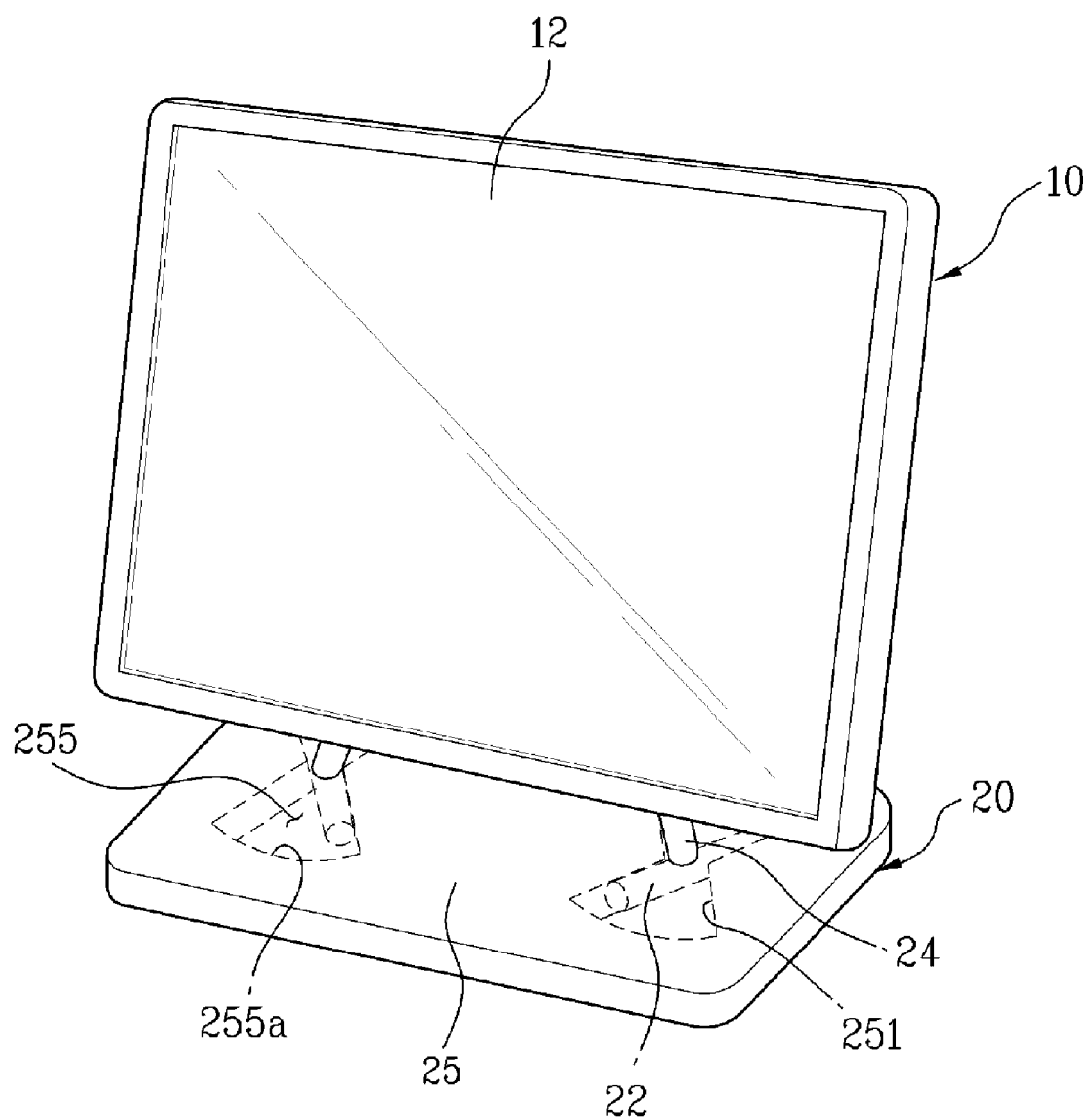
FIG. 6 illustrates a display device according to another embodiment of the present invention.

FIG. 6 illustrates another embodiment of a display device. According to the embodiment shown in FIG. 6, the base member 20 dispersing the load of the body to the floor may further include a base housing 25 accommodating the horizontal shafts 22. In the base housing 25 may be formed a horizontal shaft motion space 255 formed in a two-facing-fan shape and a limiting prominence 251 formed at a border of the horizontal shaft motion space 255 as rotation angle limiting means limiting the rotation angle of the horizontal shaft 24.

The limiting prominence 251 limits the rotation range of the horizontal shaft 22 and it may be employed to limit the tilting angle of the body, together with the guide projection and the guide groove shown in FIG. 5.

A contact surface with the horizontal shaft 22 formed in the horizontal shaft motion space 251 may be finished with material capable of supplying a proper friction to the contact surface.

To prevent the friction between ends of the horizontal shafts 22 with an inner surface 255a of the circumference of the horizontal shaft motion space 255, a fixing groove may be formed at a lower surface of a center of the horizontal shaft 22 and a fixing projection may be correspondingly formed at a lower surface of the horizontal motion space to fix a rotation center of the horizontal shaft 22 inside the horizontal shaft motion space 255.

The fixing projection and groove are provided to prevent too much friction between the horizontal shaft 22 and an inner surface of the horizontal shaft motion space 253 because the horizontal shaft 22 is one-sided in case of rotating within the two-facing-fan-shaped horizontal shaft motion space 255.

Figure 7:
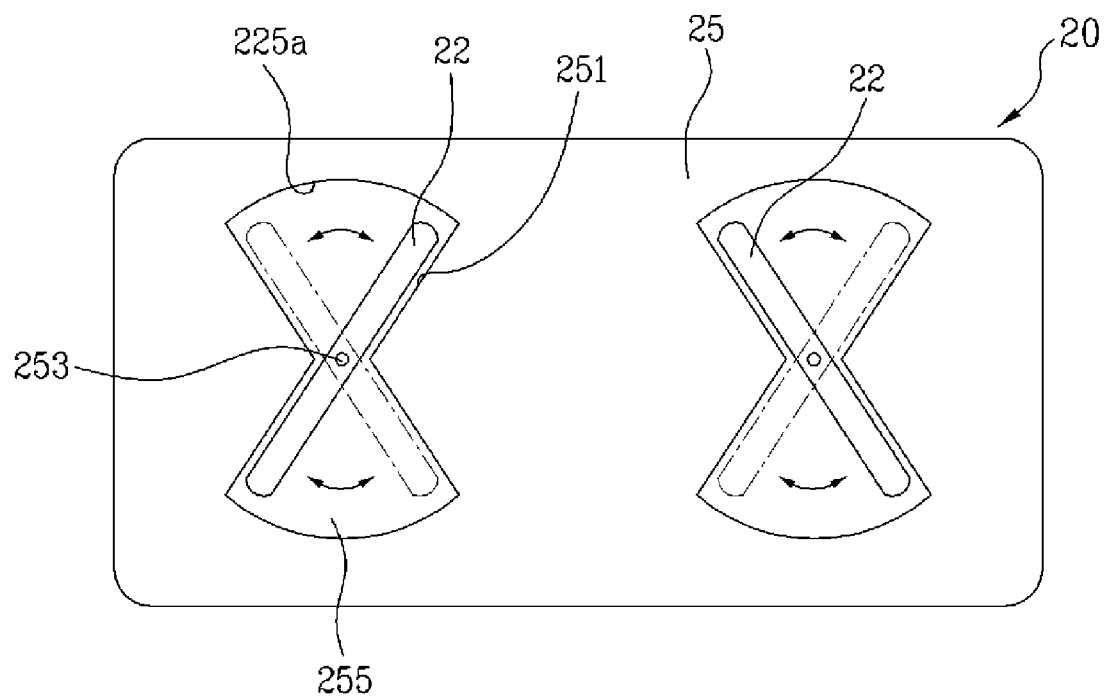
FIG. 7 is a perspective plane view illustrating a base member of the display device.
Figure 7:
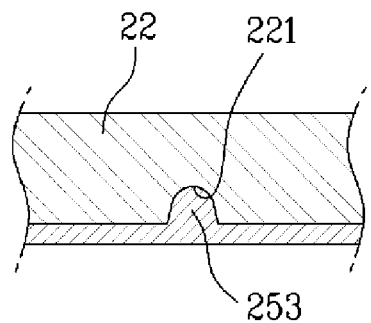

FIG. 7 is a perspective plane view of the base member 20 provided in the display device. According to the embodiment shown in FIG. 7, the fixing projection 253 is provided at a lower surface of the horizontal shaft motion space 255 and the fixing groove 221 where the fixing projection 253 is inserted is provided at a lower surface of the horizontal shaft 22.

The fixing projection 253 and the fixing groove 221 may fix the rotation center of the horizontal shaft 22 to the inside of the horizontal shaft motion space 255 and thus their positions may be exchanged if the horizontal shaft 22 is rotatably secured within the horizontal shaft motion space 255.

The rotation angle limiting means of the supporting shaft shown in FIG. 5 and the rotation angle limiting means of the horizontal shaft shown in FIG. 6 may be employed to adjusting the tilting angle of the body 10. Thus, a case in that either or both of the two is or are provided may be included in the scope of the present invention.

Figure 8:
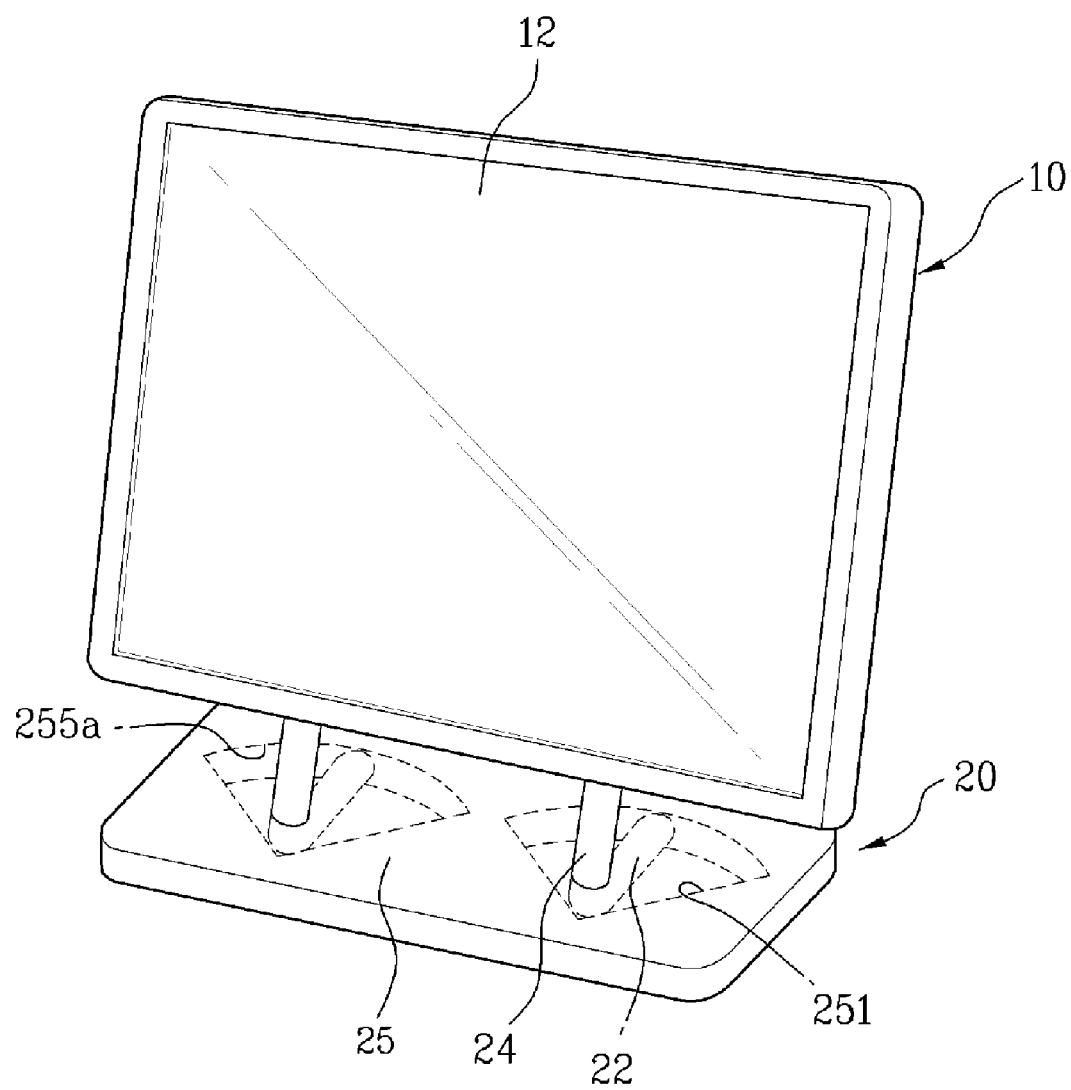
FIG. 8 illustrates a display device according to a still further embodiment of the present invention.
Figure 9:
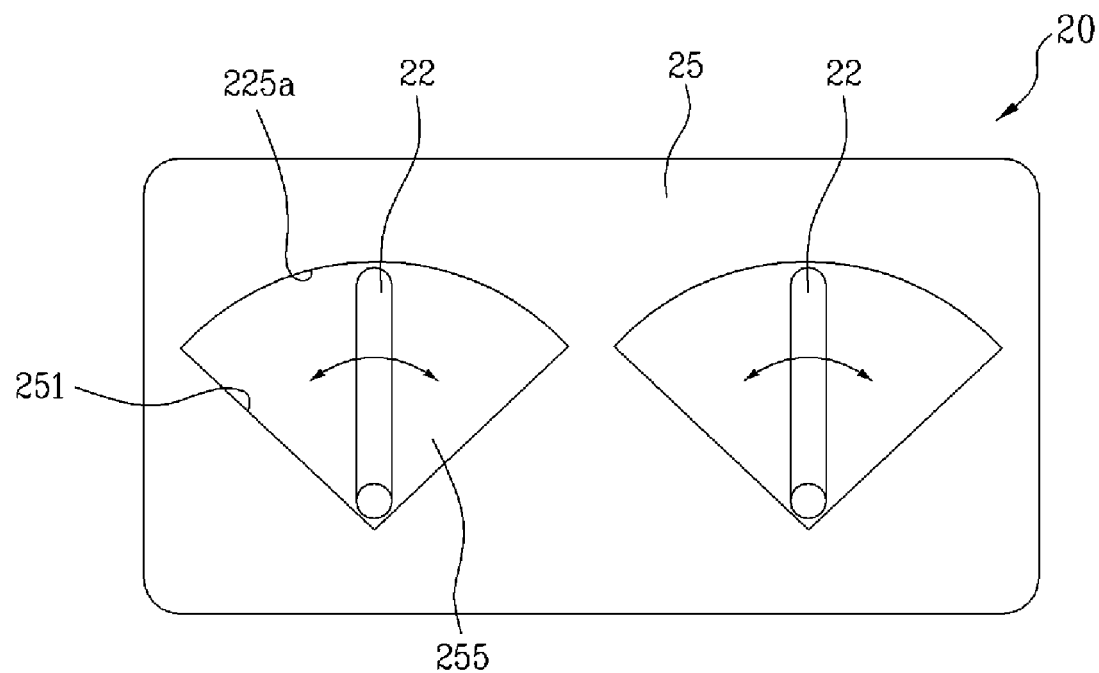
FIG. 9 is a perspective place view illustrating a base member shown in FIG. 8.
Figure 9:
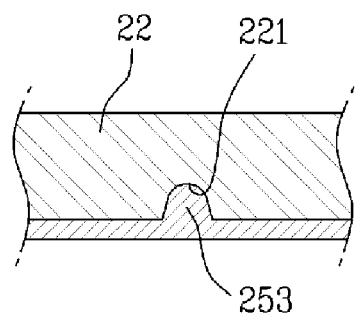

FIG. 8 illustrates another embodiment of a display device and FIG. 9 is a perspective plane view of the base member 20 shown in the embodiment of FIG. 8. The repeated description, compared with the embodiment shown in FIGS. 6 and 7, will be omitted. Different from the embodiment shown in FIGS. 6 a 7, the supporting shaft 24 and the horizontal shaft 22 supporting the body are formed in a 'L' shape. Because of that, a single horizontal shaft motion space may be provided. This embodiment of the 'L'-shaped horizontal shaft 22 and the supporting shaft 24 has an advantage of a compact width of the base housing 25 in a forward and backward direction.

Figure 10:
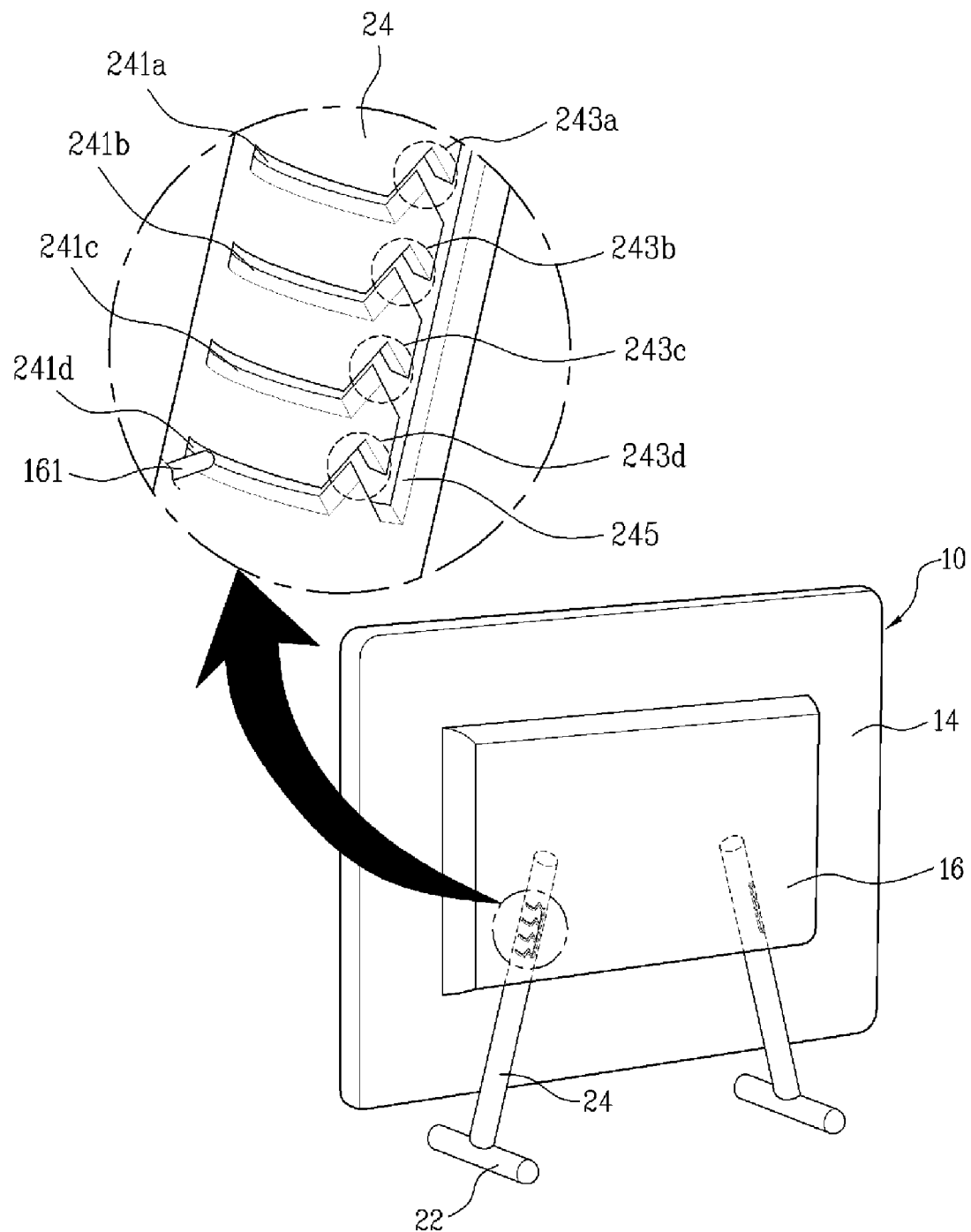
FIG. 10 illustrates a display device according to a still further embodiment of the present invention.

FIG. 10 illustrates a still further embodiment of a display device. Different from the display device shown in FIGS. 1 to 9, the display device according to the embodiment shown in FIG. 10 may have a function of adjusting the height of the body displaying images as well as the function of tilting the body.

If the display device is used as a monitor of a computer, the weight of a body desired by a user may be various and the height adjusting function may be provided.

In case that such the height adjusting function is provided, methods for that function may be various and this embodiment presents a method of providing the body height adjusting function by using the supporting shafts 24 secured to the body symmetrically, being tilted to the predetermined angle.

Like the embodiment shown in FIG. 4, rotation angle limiting means of the supporting shaft 24 provided in the display device shown in FIG. 10 may be a guide projection 161 and a guide groove 241a, 241b, 241c and 241d formed in a predetermined section of a surface of the supporting shaft 24 along a circumference of the supporting shaft 24. According to the embodiment shown in FIG. 10, a height adjustment groove 245 may be formed at the surface of the supporting shaft 24 in a longitudinal direction, together with the guide groove, to embody the body height adjusting function.

The height adjustment groove 245 is in communication with the guide groove and the guide groove may be provided in plural. The plurality of the grooves may be formed at different positions.

As shown in FIG. 10, the guide grooves 241a, 241b, 241c and 241d may be formed at the surface of the supporting shaft 24 in a circumferential direction to guide the guide projection provided at the body, such that the range in which the supporting shaft 24 is rotated with respect to the body may be limited. In addition, the guide grooves 241a, 241b, 241c and 241d may be connected with the height adjustment groove 245 formed at the surface of the supporting shaft 24 in a longitudinal direction. If the body is tilted, the guide projection 161 is guided within the guide grooves to enable the tilting of the body and if the height of the body needs to be adjusted, the guide projection 161 is movable along the height adjustment groove 245.

According to the embodiment shown in FIG. 10, the guide grooves are formed at the surface of the supporting shaft 24 in a predetermined interval and the height of the body may be adjustable according to the position of the guide projection moved along the height adjustment groove 245 in communication with the guide grooves.

An end of each guide groove 241a, 241b, 241c and 241d is dead to limit the rotation angle of the supporting shaft 24 and the other opposite end is connected with the height adjustment groove 245 cannot limit the rotation angle of the supporting shaft 24 if a curvature part which will be described later is not provided.

As a result, a curvature part may be formed at a connection portion between the each guide groove and the height adjustment groove 245. The curvature part formed at a border between the height adjustment groove 245 and the guide grooves 241a, 241b, 241c and 241d may prevent the guide projection from coming into the height adjustment groove 245 when tilting the body.

In reference to FIG. 11, a method of limiting the tilting angle of the body by using the curvature part will be described.

Figure 11:
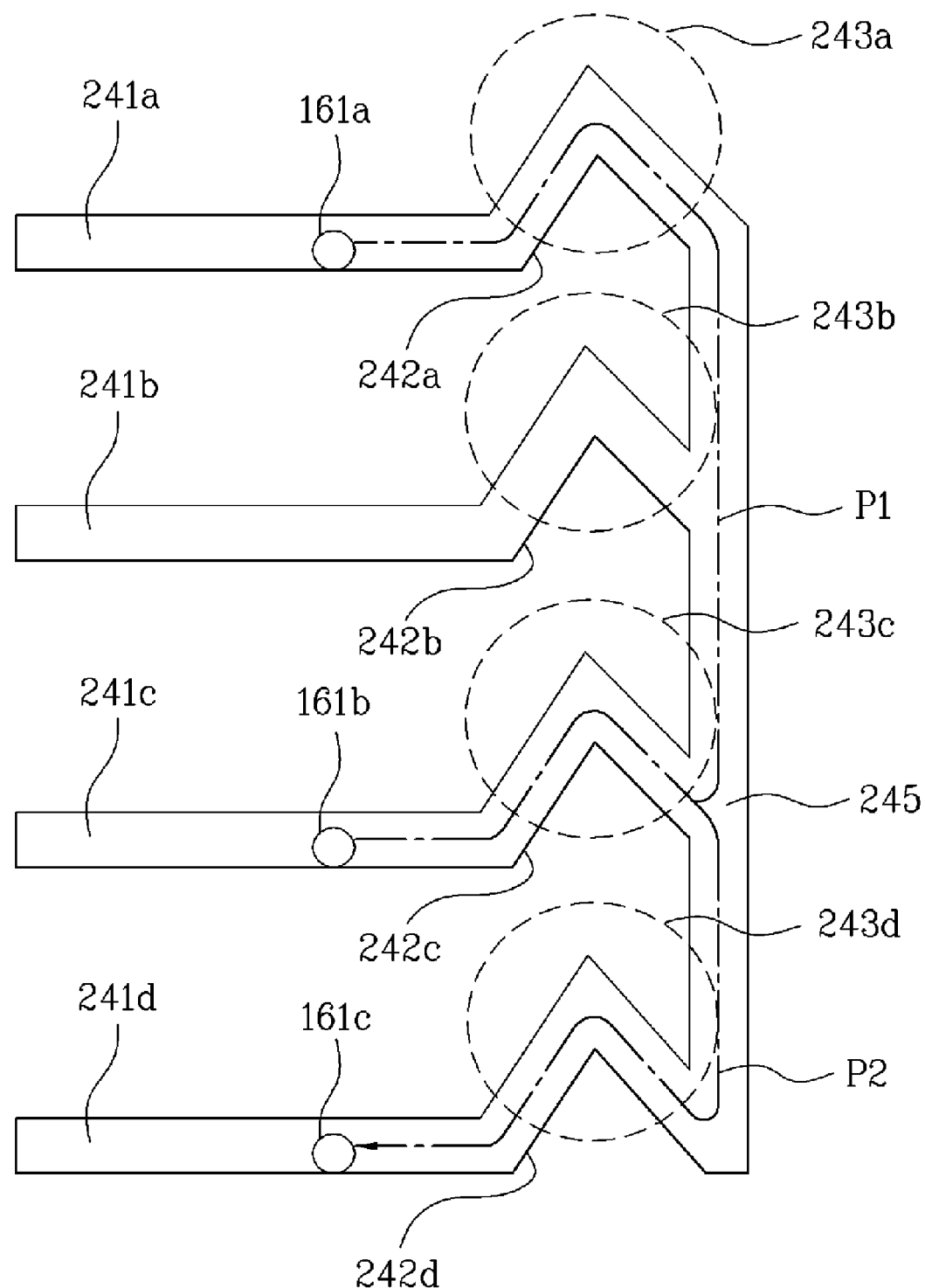
FIG. 11 is a plane view illustrating an example of connection between a guide groove and a height adjustment groove of the display device.

FIG. 11 illustrates a plane view of connection between the guide grooves 241a, 241b, 241c and 241d and the height adjustment groove 245.

As mentioned above, the guide grooves are formed at the surface of the supporting shaft 24 in a predetermined interval and the height adjustment groove 245 is formed at the surface along the longitudinal direction of the supporting shaft 24.

The curvature parts 243a, 243b, 243c and 243d may be formed between the height adjustment groove 245 and the guide grooves 241a, 241b, 241c and 241d.

As shown in FIG. 11, the curvature parts 243a, 243b, 243c and 243d are formed by curving predetermined portions of the guide grooves in a '∧' shape.

The reason why the curvature parts 243a, 243b, 243c and 243d are curved in the '∧' shape is that the guide projection is provided at the body. That is the guide projection guides the tilting of the body by using the weight of the body, in close contact with the lower surface of the guide groove if an external force is not applied.

If the guide projection 161 reaches a left end of the guide groove or a supporting surface of the curvature part, the guide projection may not slide farther within the guide groove and the sliding motion is limited and thus the tilting of the body is limited.

That is, since an external force is applied to the guide projection downward within the guide groove, the supporting surface of the curvature part can limit the rotation angle of the supporting shaft 24 or the tilting angle of the body.

If trying to increase the height of the body, the user removes the force applied to the guide projection, that is, the weight of the body and he/she moves the guide projection to a new position. Here, the number of the supporting shafts 24 of the display device according to the present invention is two and the height of each supporting shaft 24 should be changed.

To embody the height adjusting function, the user may move the body and slide the supporting shafts in a direction in parallel to its longitudinal direction to change the position of the guide projection.

According to the embodiment shown in FIG. 11, the guide projection 161b positioned in a third one 241c of the guide grooves in a longitudinal direction is moved to a first one 241a along a first path (P1) to increase the height of the body. The guide projection 161d positioned in the third guide groove 241c is moved to a fourth guide groove 241d along a second path (P2) to lower the height of the body.

Figure 12:
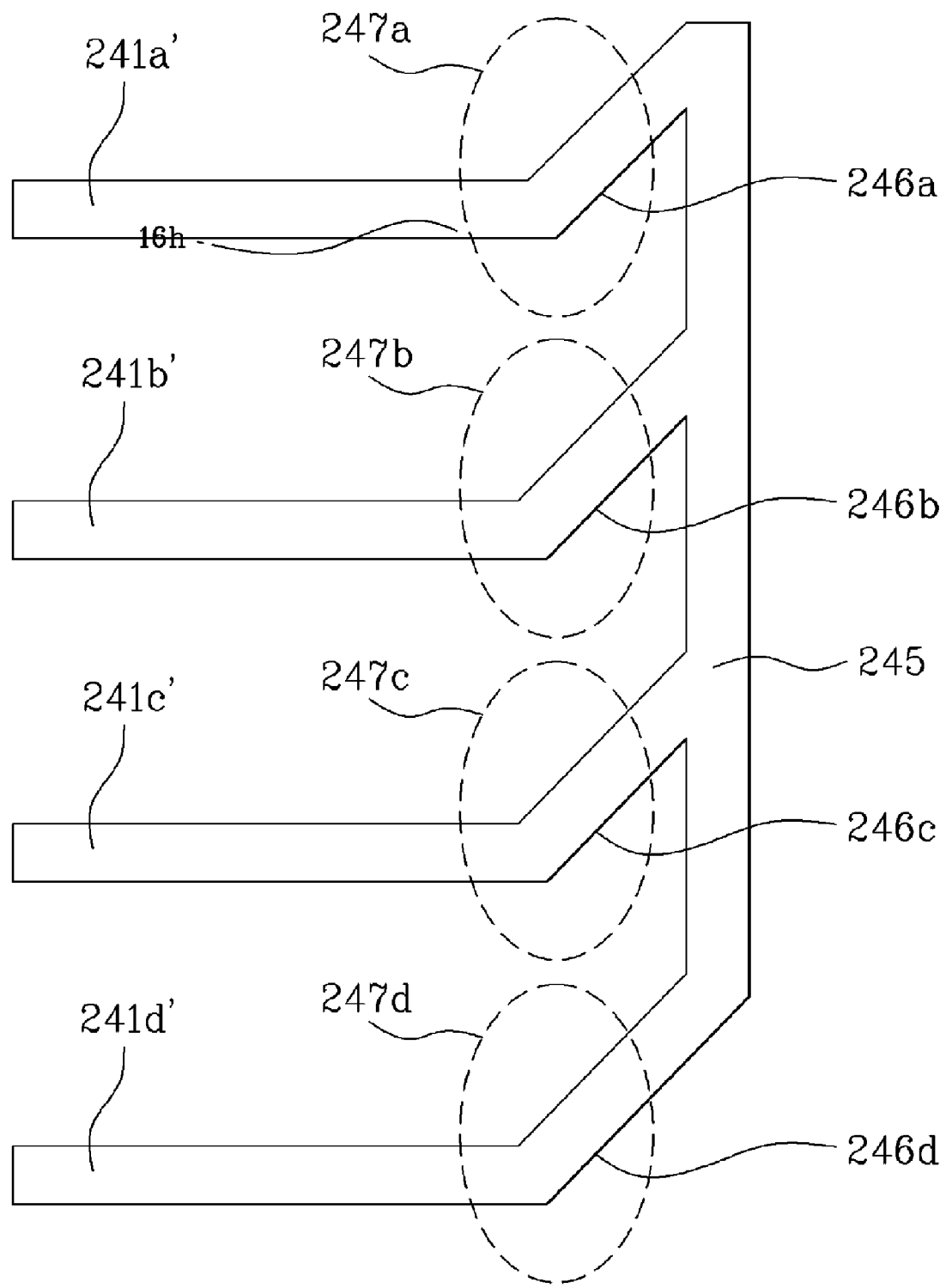
FIG. 12 is a place view illustrating another example of connection between a guide groove and a height adjustment groove of the display device.

FIG. 12 is a plane view of another embodiment of connection between the guide grooves and the height adjustment groove 245.

Compared with the embodiment shown in FIG. 11, the repeated description of this embodiment will be omitted. Different from the embodiment shown in FIGS. 8 and 9 in that the rotation angle of the supporting shaft 24 is the curvature parts of the '^' shape formed at the guide grooves 241a, 241b, 241c and 241d, this embodiment presents oblique portions of a '/' shape. Oblique surfaces 246a, 246b, 246c and 246d of the oblique portion limits the motion of the guide projection 161, like oblique surface 242a, 242b, 242c and 242d of the curvature part, to limit the rotation of the supporting shaft 24 or the tilting of the body.

Directions of the oblique surfaces of the curvature part and the oblique portion provided at the connection between the guide groove and the height adjustment groove 245, shown in FIGS. 11 and 12, may be changeable based on whether the guide projection is provided at the body or the supporting shaft 24.

For example, if the guide projection is provided at the supporting shaft 24 and the guide groove is provided at the body, the guide projection adjusts the tilting angle of the body, sliding along the upper surface of the guide groove. To limit the sliding motion of the guide projection along the upper surface of the guide groove, the curvature part should have 'V' shape, not '∧' shape, and the oblique direction of the oblique portion should be '\'-shaped, not '/'shaped.

The shape of the curvature part or the direction of the oblique portion may be determined corresponding to the installation position of the guide projection. Any cases capable of adjusting the rotation angle of the supporting shaft or the tilting angle of the body by selectively limiting the motion of the guide projection may be included in the scope of the present invention.

As a result, the shape of the curvature part or the oblique portion may be determined according to positions where the guide projection and the guide groove are provided.

Figure 13:
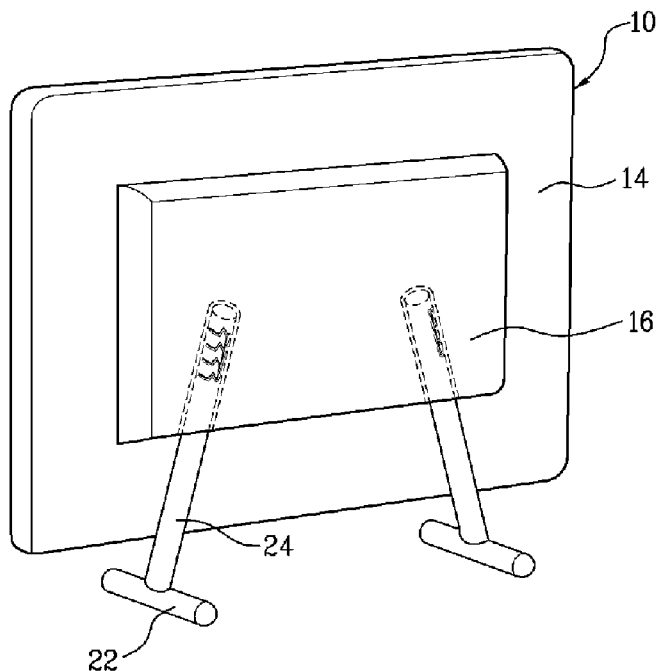
FIG. 13 is a perspective view illustrating a rear of the display device.
Figure 13:
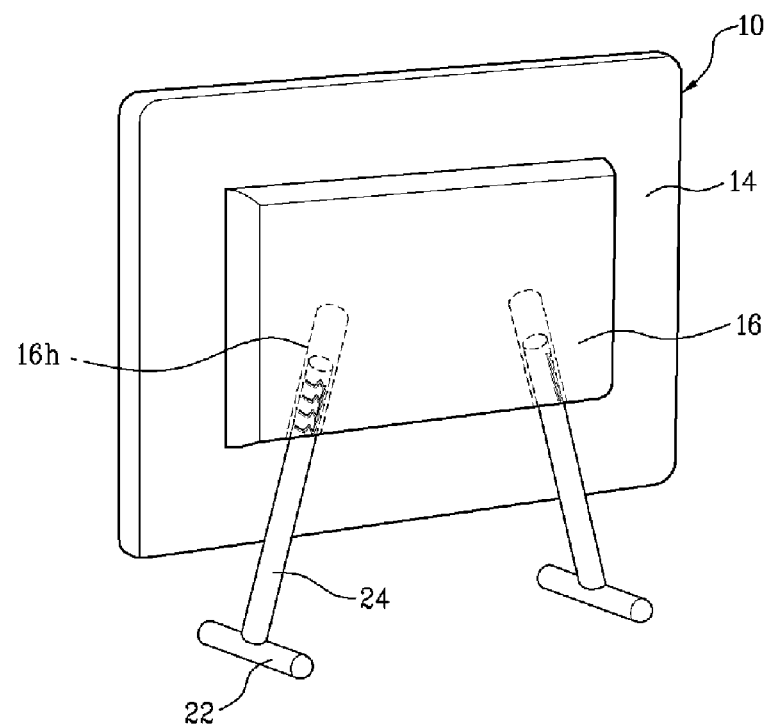

FIG. 13 is a perspective view illustrating a rear of the display device according to the present invention. Specifically, FIG. 13(a) is a perspective view if the body of the display device is heightened and FIG. 13(b) is a perspective view if the body is lowered. As shown in FIG. 10, the body securing part 16 is provided at the rear of the body 10 and the supporting shaft 24 is secured to the body securing part 16, being tilted to the predetermined angle.

The insertion depth inside an insertion hole 16h formed at the body securing part 16 may be adjustable such that the supporting shaft 24 may be rotatably secured to the body securing part 16, being tilted and that the height of the body may be adjusted.

Here, the guide projection and the guide groove may be employed as means capable of rotatably securing the supporting shaft 24 to the body 10. That is, they may function to prevent the separation of the body 10 and the supporting shaft 24 as mentioned above. Therefore, according to the display device of the present invention, the tilting angle or height of the body may be adjusted simply. In addition, the number of the parts composing the stand performing the height adjusting or tilting function may be reduced remarkably and the cost of the parts may be reduced accordingly.

Furthermore, the display device according to the present invention can simplify the configuration of the stand and various designs may be applicable to the display device accordingly.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A display device comprising:
a body displaying an image;
a pair of supporting shafts rotatably secured to the body, being tilted to a predetermined angle;
rotation angle limiting means limiting a rotation angle of the supporting shaft; and
a base member supporting the supporting shaft,
wherein when the supporting shaft is rotated and the base member is rotated parallel to an installation surface such that the base member is in contact with the installation surface, the body is tilted to a predetermined angle with respect to the installation surface, and
wherein the rotation angle limiting means comprises a guide projection formed at either of the supporting shaft and the body, and a guide groove formed at the other of the supporting shaft and the body.

2. The display device as claimed in claim 1, wherein the supporting shafts are secured to the body in a state of being symmetrically tilted to a substantially identical angle, respectively.

3. The display device as claimed in claim 2, wherein the base member comprises a pair of horizontal shafts coupled to the supporting shafts, substantially perpendicular to the supporting shafts.

4. The display device as claimed in claim 3, wherein the supporting shaft and the horizontal shaft are formed integrally.

5. The display device as claimed in claim 3, wherein the supporting shaft and the horizontal shaft have a 'L' shape or are coupled to each other to have a 'L' shape.

6. The display device as claimed in claim 3, wherein the supporting shaft and the horizontal shaft have a '⊥' shape or are coupled to each other to have a shape.

7. The display device as claimed in claim 3, wherein the base member further comprises a base housing accommodating the horizontal shaft and a horizontal shaft motion space guiding the rotation of the horizontal shaft is formed in the base housing and the rotation angle limiting means comprises a limiting prominence provided at a border of the horizontal shaft motion space.

8. The display device as claimed in claim 3, wherein a body securing part to which the supporting shaft is secured is provided at a rear of the body and the supporting shaft is rotatably inserted in the body securing part.

9. The display device as claimed in claim 1, wherein the guide groove is formed in a predetermined area of a surface of the supporting shaft along a circumferential direction.

10. The display device as claimed in claim 9, wherein a height adjustment groove is formed at the surface of the supporting shaft along a longitudinal direction, the height adjustment groove in communication with the guide groove, and a plurality of guide grooves are formed at predetermined positions different from a position of the height adjustment groove.

11. The display device as claimed in claim 10, wherein a curvature part, curved in an upward direction of the guide groove, is provided near a border between the height adjustment groove and the guide groove to prevent the guide projection from coming into the height adjustment groove if tilting the body.

12. A display device comprising:
a body displaying an image; and
a pair of stands secured to the body, having a '⊥' shape, wherein if the body is tilted, a '-' portion of the stand is rotated corresponding to rotation of a '|' portion of the stand rotatably secured to the body in a state of being tilted or the '|' portion of the stand is rotated corresponding to the rotation of the '-' portion of the stand,
wherein the '|' portions of the pair of the '⊥'-shaped stands are symmetrically secured to the body in a state of being tilted to a substantially identical angle, respectively, and
wherein the '-' portion of the stand is secured to a base housing and the '-' portion of the stand is rotated in contact with a lower surface of the base housing.

13. The display device as claimed in claim 12, wherein the '-' portion formed integrally with the '|' portion of the stand rotatably secured to the body is rotated in contact with an installation surface.

14. The display device as claimed in claim 12, wherein a body securing part to which the '|' portion of the stand is secured is provided at a rear of the body and a supporting shaft is rotatably inserted in the body securing part.

* * * * *